United States Patent
Van De Vrie et al.

(10) Patent No.: US 9,891,346 B2
(45) Date of Patent: Feb. 13, 2018

(54) METHOD OF PRINTING AN OPTICAL ELEMENT

(71) Applicant: LUXEXCEL HOLDING B.V., Kruiningen (NL)

(72) Inventors: Richard Van De Vrie, Wolphaartsdijk (NL); Ricardo Blomaard, Goes (NL); Joris Biskop, Vlissingen (NL)

(73) Assignee: LUXEXCEL HOLDING B.V., Eindhoven (NL)

( * ) Notice: Subject to any disclaimer, the term of this patent is extended or adjusted under 35 U.S.C. 154(b) by 131 days.

(21) Appl. No.: 14/758,826

(22) PCT Filed: Jan. 6, 2014

(86) PCT No.: PCT/EP2014/050079
§ 371 (c)(1),
(2) Date: Jul. 1, 2015

(87) PCT Pub. No.: WO2014/108364
PCT Pub. Date: Jul. 17, 2014

(65) Prior Publication Data
US 2016/0003977 A1    Jan. 7, 2016

(30) Foreign Application Priority Data
Jan. 10, 2013   (EP) .................................. 13150839

(51) Int. Cl.
*G02B 1/00*   (2006.01)
*B29D 11/00*  (2006.01)
(Continued)

(52) U.S. Cl.
CPC ............ *G02B 1/00* (2013.01); *B29C 67/0059* (2013.01); *B29D 11/00423* (2013.01); *B33Y 10/00* (2014.12); *B33Y 30/00* (2014.12); *B33Y 80/00* (2014.12); *B41J 11/002* (2013.01); *B29K 2083/00* (2013.01)
(Continued)

(58) Field of Classification Search
CPC ...... G02B 1/00; G02B 6/1221; G02B 6/1228; G02B 6/138; G02B 2006/121;
(Continued)

(56) References Cited

U.S. PATENT DOCUMENTS 5,498,444 A * 3/1996 Hayes .................... B29C 41/36
                                                                    347/1
8,840,253 B2   9/2014 Kitano
(Continued)

FOREIGN PATENT DOCUMENTS

EP    2474404 A1    7/2012
WO    2010/091888 A1    8/2010

OTHER PUBLICATIONS

International Preliminary Report on Patentability, Application No. PCT/EP2014/050079 dated Jul. 23, 2015.
(Continued)

*Primary Examiner* — Bao Q Truong
(74) *Attorney, Agent, or Firm* — The Dobrusin Law Firm, P.C.

(57) ABSTRACT

The present inventions refers to a method for printing an optical element (11) comprising the steps of ejecting at least one droplet (6) of printing material comprising silicone towards a substrate (8) in a first step and curing the droplet deposited on the substrate in a second step.

17 Claims, 1 Drawing Sheet

(51) Int. Cl.
  *B29C 67/00* (2017.01)
  *B33Y 80/00* (2015.01)
  *B33Y 10/00* (2015.01)
  *B33Y 30/00* (2015.01)
  *B41J 11/00* (2006.01)
  *B29K 83/00* (2006.01)

(58) Field of Classification Search
  CPC .......... G02B 2006/12069; B33Y 10/00; B33Y 30/00; B33Y 80/00; B29C 67/0059; B29D 11/00423; B29D 11/00682; B41J 11/002; B29K 2083/00
  See application file for complete search history.

(56) References Cited

U.S. PATENT DOCUMENTS

| | | | |
|---|---|---|---|
| 9,333,717 B2* | 5/2016 | Pitwon | G02B 6/1221 |
| 2005/0046957 A1* | 3/2005 | Lai | B29D 11/00355 359/652 |
| 2005/0058773 A1* | 3/2005 | Hasei | B29D 11/00365 427/162 |
| 2006/0012058 A1* | 1/2006 | Hasei | B29C 41/12 264/1.32 |
| 2009/0147367 A1* | 6/2009 | Blondal | G02B 27/2214 359/619 |
| 2012/0019936 A1 | 1/2012 | Blessing et al. | |
| 2013/0286073 A1 | 10/2013 | Blessing et al. | |
| 2015/0061166 A1 | 3/2015 | Van De Vrie et al. | |
| 2015/0086754 A1 | 3/2015 | Van De Vrie et al. | |
| 2015/0093544 A1 | 4/2015 | Van De Vrie et al. | |
| 2015/0093552 A1 | 4/2015 | Biskop et al. | |
| 2015/0104991 A1 | 4/2015 | Biskop et al. | |

OTHER PUBLICATIONS

International Search Report, Application No. PCT/EP2014/050079 dated Mar. 27, 2014.

* cited by examiner

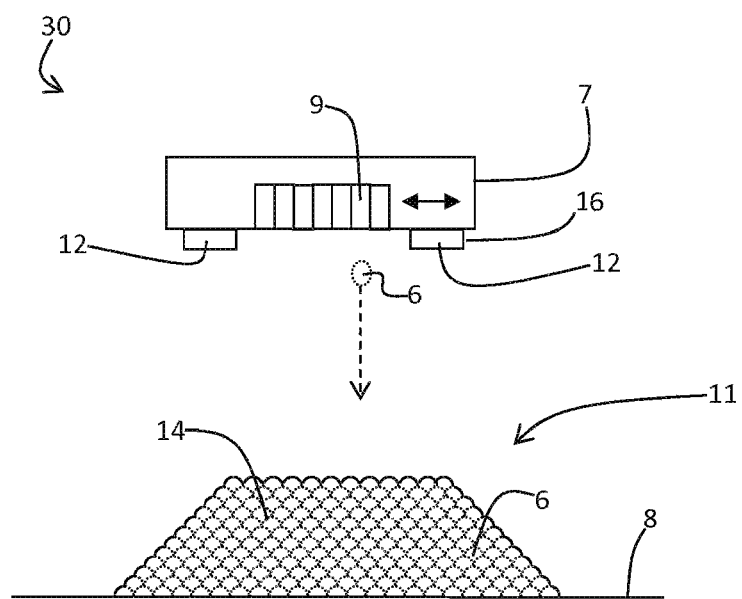

METHOD OF PRINTING AN OPTICAL ELEMENT

BACKGROUND

The present inventions refers to a method for printing an optical element comprising the steps of ejecting at least one droplet of printing material towards a substrate in a first step and curing the droplet deposited on the substrate in a second step.

It is well known from the applicant's prior art document WO 2010/091 888 A1 to print three-dimensional structures, in particular optical elements, by means of droplet-on-demand inkjet technologies. A movable print head is used for depositing single droplets of a transparent printing ink a certain positions onto a substrate. The print head is provided with UV light sources for curing the deposited droplets by UV irradiation. A three-dimensional optical element is built up by a plurality of deposited and cured droplets arranged at least partially one above the other and one beside the other.

Usually, a polymer based printing ink is used as curable printing ink for printing the three dimensional structures. A disadvantage of this purpose is that the heat stability of the three dimensional structures is comparatively low, so that the three dimensional structures are not suitable as optics for those light sources which generate much heat energy. There is a danger that the optic is melted through the heat.

SUMMARY

It is an object of the present invention to provide a method for printing an optical element and to provide an optical element, wherein the optical element is suitable as optic for heat producing light sources.

The object of the present invention can be achieved with a method for printing an optical element comprising the steps of ejecting at least one droplet of printing material comprising silicone towards a substrate in a first step and curing the droplet deposited on the substrate in a second step.

It is herewith advantageously possible to built up an optical element which comprises a substantially higher heat stability compared to the printed optical elements known from the prior art because silicone has a comparatively high thermal resistance, in particular up to 250° Celsius. Simultaneously, silicone can be used as liquid printing ink in a conventional drop-on-demand inkjet printer. Silicone in the sense of the present invention is preferably a polymer that includes silicon together with carbon, hydrogen, oxygen, and sometimes other elements.

According to a preferred embodiment of the present invention, the printing material ejected in the first step comprises a mixture of silicone and acrylics. Additionally or alternatively, the printing material ejected in the first step comprises a viscosity between 5 and 12 centipoise and/or the printing material ejected in the first step comprises an epoxy modified cationic UV curing silicone.

According to another preferred embodiment of the present invention, the deposited droplet is cured in the second step by ultraviolet irradiation, wherein preferably the amount of ultraviolet irradiation is altered during the second step.

According to another preferred embodiment of the present invention, the deposited droplet is cured in the second step by infrared irradiation. The infrared irradiation is performed e.g. by an infrared light source incorporated into the print head, for instance.

According to another preferred embodiment of the present invention, the printing material of the at least one droplet is heated at least to 75 degree Celsius, preferably at least to 100 degree Celsius and particularly preferably at least to 150 degree Celsius before and/or while ejecting the droplet during the first step. It is herewith advantageously possible to achieve a certain viscosity of the printing ink during ejection of the droplets towards the substrate.

Preferably, a plurality of droplets are ejected towards the substrate in the first step and cured in the second step. In this manner, an arbitrary optical element of almost any form and shape can be printed flexible and individually customized.

According to another preferred embodiment of the present invention, the further droplets of printing material are ejected towards the substrate in a third step and cured in a fourth step, wherein the droplets and the further droplets are cured again in a fifth step. The fifth steps can be used as a final curing step to obtain a hardened outer surface of the optical element. Preferably, the droplets and the further droplets are finally cured in the fifth step by providing heat to the droplets, in particular using infrared irradiation.

In principle, it is conceivable that the substrate is heated in the second, fourth and/or fifth step.

Another subject of the present invention is a printer for printing an optical element by performing the above mentioned method according to the present invention, wherein the printer comprises a reservoir containing a printing material comprising silicone, a print head having ejection means for ejecting the at least one droplet towards the substrate and a curing means for curing the at least one deposited droplet. Preferably, the curing means comprises a UV spot, a IR spot and/or a heat source coupled to the substrate. Particularly, the printer comprises a heater for heating the printing material in the reservoir at least to 75 degree Celsius, preferably at least to 100 degree Celsius and particularly preferably at least to 150 degree Celsius.

Another subject of the present invention is an optical element printed by the method above mentioned method according to the present invention, wherein the optical elements is built up by multiple droplets of printing ink, wherein the printing ink comprises a silicone.

Preferably, the printing ink comprises a mixture of silicone and acrylics. Additionally or alternatively, the printing material comprises a viscosity between 5 and 12 centipoise before curing and/or the printing material comprises an epoxy modified cationic UV curing silicone. Silicone in the sense of the present invention is preferably a polymer that includes silicon together with carbon, hydrogen, oxygen, and sometimes other elements.

These and other characteristics, features and advantages of the present invention will become apparent from the following detailed description, taken in conjunction with the accompanying drawing, which illustrates, by way of example, the principles of the invention. The description is given for the sake of example only, without limiting the scope of the invention. The reference FIGURES quoted below refer to the attached drawings.

BRIEF DESCRIPTION OF THE DRAWING

FIG. 1 illustrates schematically a method for printing a three-dimensional structure and a printed article according to an exemplary embodiment of the present invention.

DETAILED DESCRIPTION

The present invention will be described with respect to particular embodiments and with reference to certain drawings but the invention is not limited thereto but only by the claims. The drawings describe the invention only schematically and non-limiting. In the drawings, the size of some of the elements may be exaggerated and not drawn on scale for illustrative purposes.

Where an indefinite or definite article is used when referring to a singular noun, e.g. "a", "an", "the", this includes a plural of that noun unless something else is specifically stated.

Furthermore, the terms first, second, third and the like in the description and in the claims are used for distinguishing between similar elements and not necessarily for describing a sequential or chronological order. It is to be understood that the terms so used are interchangeable under appropriate circumstances and that the embodiments of the invention described herein are capable of operation in other sequences than described of illustrated herein.

In FIG. 1 a method for printing an optical element 11 and a printed optical element 11 respectively according to the exemplary embodiment of the present invention is schematically shown. It could be seen from FIG. 1 that a plurality of droplets 6 of printing ink are deposited onto a substrate 8 by means of a print head 7 in order to build up a three-dimensional optical element 11. The droplets 6 are deposited side by side and one above the other, as indicated by the dashed lines 14, in order to generate the three-dimensional form. The printing ink comprises an UV curable silicone; preferably an epoxy modified cationic UV curing silicone. The print head 7 moves over the substrate 8 and ejects the droplets 6 of printing ink by means of ejecting nozzles 9 to deposit the individual droplets 6 in a certain pattern. It is conceivable that the printing ink is heated inside the print head 7 before ejection in order to increase the viscosity of the silicone. After deposition of the droplets 6, adjacent deposited droplets 6 preferably merge which each other (the lower droplets 6 are therefore illustrated only schematically by the dashed lines 14) and are subsequently cured by UV-light emitted by LED's (light emitting diodes) 12 of the print head 7. Alternatively, the deposited printing material is cured by irradiation of infrared light. In this case, the print head 7 is provided with IR emitting light sources 16. Advantageously, the silicone based printing ink is UV resistant, clear and can stand up to extreme temperatures, so that the optical element 11 can be used as an optic for a light source which generates much heat energy without the danger of melting or getting unclear. Preferably, the printing ink is a mixture of silicone and acrylics with a viscosity between 5 and 12 centipoise during ejection. The print head 7 is a part of a drop-on-demand inkjet printer 30.

What is claimed is:

1. Method for printing an optical element comprising the steps of:
    ejecting at least one droplet of printing material comprising silicone towards a substrate in a first step; and
    curing the droplet deposited directly or indirectly onto the substrate in a second step by ultraviolet irradiation, wherein the amount of ultraviolet irradiation is altered in the second step.

2. Method according to claim 1, wherein the printing material ejected in the first step comprises a mixture of silicone and acrylics.

3. Method according to claim 2, wherein the printing material ejected in the first step comprises a viscosity between 5 and 12 centipoise.

4. Method according to claim 1, wherein the printing material ejected in the first step comprises an epoxy modified cationic UV curing silicone.

5. Method according to claim 1, wherein the deposited droplet is cured in the second step by infrared irradiation.

6. Method according to claim 1, wherein the printing material of the at least one droplet is heated at least to 75 degree Celsius, during the first step.

7. Method according to claim 1, wherein a plurality of droplets are ejected towards the substrate in the first step and cured in the second step.

8. Method according to claim 1, wherein further droplets of printing material are ejected towards the substrate in a third step and cured in a fourth step, wherein the droplets and the further droplets are cured again in a fifth step.

9. Method according to claim 8, wherein the droplets and the further droplets are finally cured in the fifth step by providing heat to the droplets and further droplets, in particular by using infrared irradiation.

10. Method according to claim 9, wherein the substrate is heated in the second, fourth and/or fifth step.

11. Printer for printing an optical element by performing a method according to claim 1, wherein the printer comprises a reservoir containing a printing material comprising silicone, a print head having ejection means for ejecting the at least one droplet towards the substrate and a curing means for curing the at least one deposited droplet.

12. Printer according to claim 11, wherein the curing means comprises a UV spot, a IR spot and/or a heat source coupled to the substrate.

13. Printer according to claim 12, wherein the printer comprises a heater for heating the printing material in the reservoir at least to 75 degree Celsius, preferably at least to 100 degree Celsius and particularly preferably at least to 150 degree Celsius.

14. Optical element printed by a method according to claim 1, wherein the optical element is built up by multiple droplets of printing ink, wherein the printing ink comprises a silicone.

15. Optical element of claim 14, wherein the optical element is a three-dimensional form generated by droplets deposited side by side and one above the other and wherein adjacent deposited droplets are merged with each other.

16. Optical element of claim 14, wherein the optical element is UV resistant, clear, and useful with a light source without danger of melting or getting unclear.

17. Optical element of claim 16, wherein the optical element includes an epoxy modified cationic UV curing silicone, a mixture of silicone and acrylics, or both.

* * * * *